May 12, 1970
R. W. HANSON
3,511,949
CONTROL APPARATUS
Filed Oct. 14, 1968
2 Sheets-Sheet 1
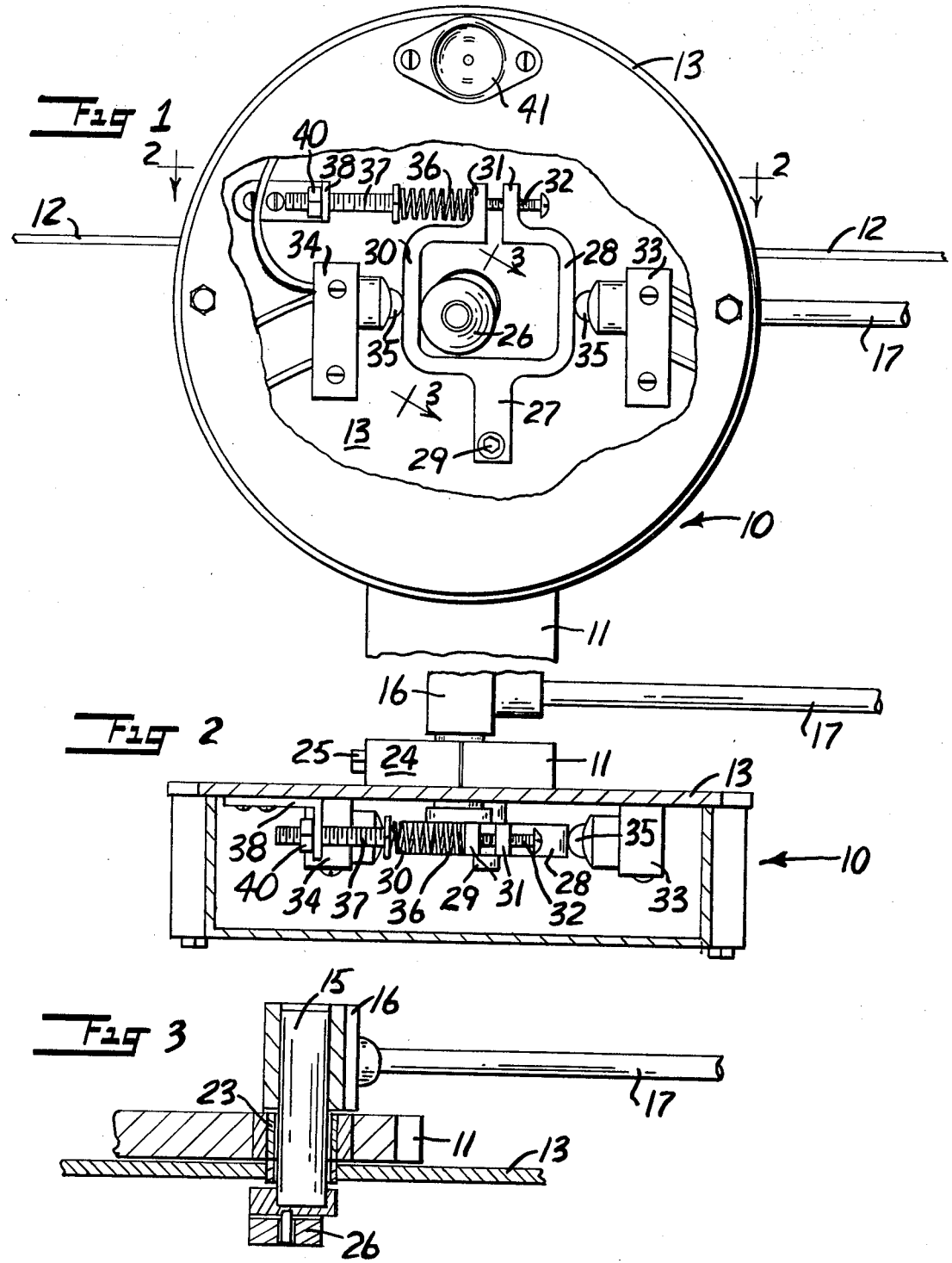
INVENTOR.
Richard W. Hanson
BY
Wells & St. John
ATTYS.

May 12, 1970          R. W. HANSON          3,511,949
CONTROL APPARATUS
Filed Oct. 14, 1968                              2 Sheets-Sheet 2
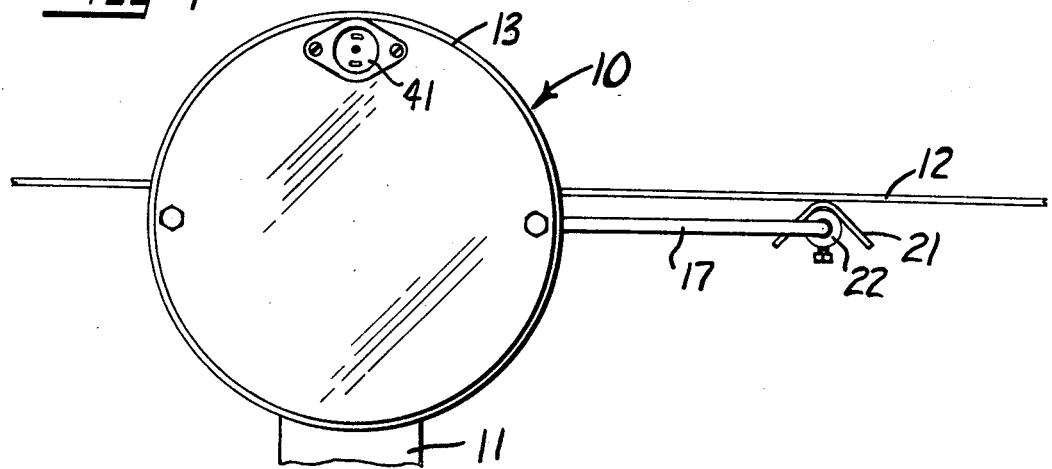
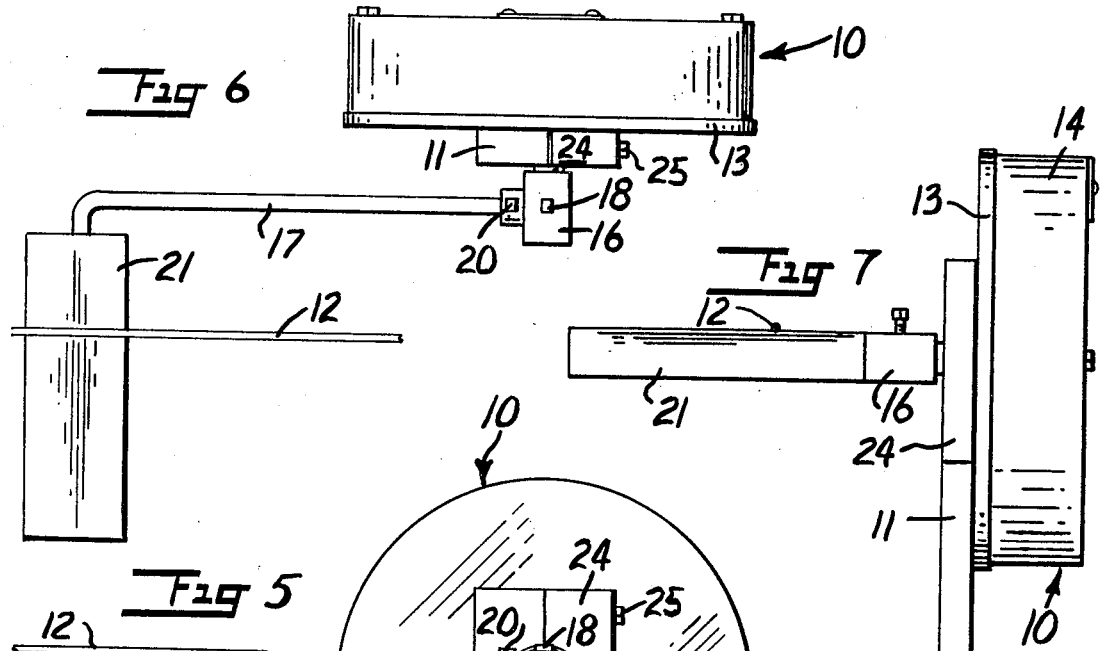
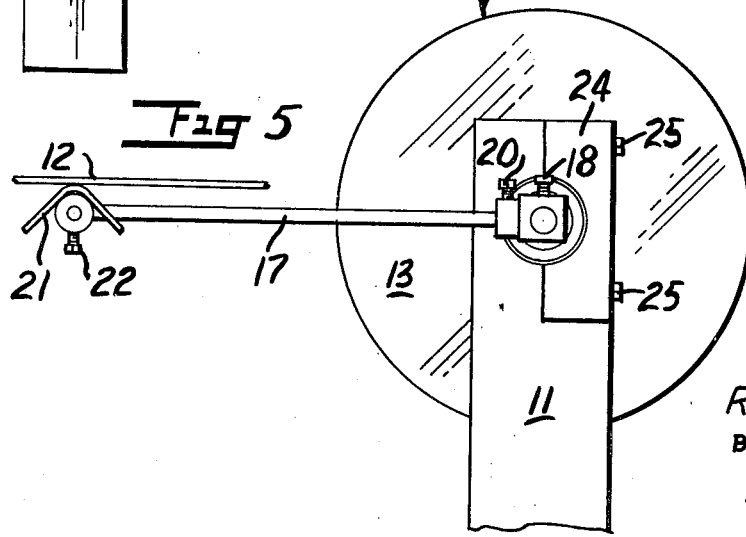
INVENTOR.
Richard W. Hanson
BY
Wells & St. John
ATTYS.

United States Patent Office 3,511,949
Patented May 12, 1970

3,511,949
CONTROL APPARATUS
Richard W. Hanson, Spokane, Wash., assignor to R. A. Hanson Company, Inc., Spokane, Wash., a corporation of Washington
Filed Oct. 14, 1968, Ser. No. 767,424
Int. Cl. H01h 35/00, 3/16
U.S. Cl. 200—52
6 Claims

ABSTRACT OF THE DISCLOSURE

A control apparatus for a moving frame that is to be monitored in position or orientation with respect to a surface along a fixed element such as a string line. The control apparatus monitors movement in a selected plane, and includes a housing that pivotally supports a control arm for movement about a first axis perpendicular to the plane. An eccentric extension on the control arm engages a split member that controls two opposed switches. The split member is spring biased against the control arm extension and an adjustment screw permits spreading of the arms of the split member to vary the tolerance of the apparatus.

BACKGROUND OF THE INVENTION

The present apparatus relates in general to devices that monitor the position of a movable frame relative to a reference surface. As an example, it can be used to monitor movement of a vehicle in a particular plane with reference to a fixed string line or other reference surface located along the path of movement desired for the vehicle. Two units spaced along the surface can be used to monitor orientation of the vehicle relative to the plane of the reference surface. Such control devices are used in road and canal construction for elevational and steering control purposes and for cross leveling. An example of a prior device in this field is shown in the Raymond A. Hanson Pat. 3,247,771.

SUMMARY OF THE INVENTION

A control apparatus is provided for monitoring the position of a frame (such as a vehicle frame) within a selected plane (vertical, horizontal or transverse) relative to a surface along a fixed reference element (such as a string line). The apparatus includes a housing that is fixed to the frame and movable therewith. A control arm is pivotally mounted on the housing about a first axis perpendicular to the selected plane. The arm includes a portion extending radially outward from the axis and being in contact with the reference elements. A member having two spaced arms is pivotally mounted on the housing about a second axis radially offset from and parallel to the first axis. The control arm includes a radial extension engaged against one arm of the member. Two control switches are mounted on the housing in opposition to one another, each being engageable by a separate one of the arms. Means is provided between the arms to selectively vary their separation along the selected plane so as to increase or decrease the delay in operation of the switches responsive to angular movement of the member about its pivotal axis on the housing.

One object of this invention is to provide a universally acceptable control apparatus for monitoring movement of a frame in any selected plane with respect to a reference member such as a string line. The apparatus is readily usable in both a vertical or horizontal orientation.

Another object of this invention is to provide a relatively simple mechanical apparatus for operating sensitive electrical switches in a control system for a moving vehicle, the apparatus being capable of operating accurately despite normal vibration and external forces encountered by the vehicle.

Another object of the invention is to provide an apparatus that permits simple adjustment for varying the tolerance of the control structure and which includes a simple adjustment for varying the pressure of the control arm against the reference element.

Another object of this invention is to provide such a control apparatus that permits the control arm to be rotated in a full circle without damaging the remainder of the structure.

These and further objects will be evident from the following disclosure, taken together with the accompanying drawings, which illustrate a preferred form of the invention. It is to be understood that this form of the invention is presented only by way of example, and that modifications can be made in the device without deviating from the inventive concepts set out herein.

BRIEF DESCRIPTION OF THE DRAWINGS

FIG. 1 is a side elevation view of the apparatus with the front wall of the housing partially broken away;
FIG. 2 is a sectional view taken along line 2—2 in FIG. 1;
FIG. 3 is a sectional view taken along line 3—3 in FIG. 1;
FIG. 4 is a side elevation view of the complete apparatus;
FIG. 5 is a side elevation view opposite to FIG. 4;
FIG. 6 is a top view of the apparatus in FIG. 5;
FIG. 7 is an end view taken from the right in FIG. 6.

DESCRIPTION OF THE PREFERRED EMBODIMENT

The intended use and external appearance of the control apparatus is shown in FIGS. 4–7. FIGS. 1–3 show the internal working mechanism of the apparatus.

As shown in FIG. 4, the control apparatus 10 is fixed to a frame member 11 that is to be monitored in a selected plane relative to a fixed reference element illustrated in the form of a string line 12. The control apparatus 10 is adapted to monitor movement of the frame member 11 in a plane that is parallel to a supporting wall 13 of an enclosed housing formed by wall 13 and a removable cover 14. The selected plane for wall 13 can be vertical, as illustrated, or can be horizontal or in any other desired orientation. As an example, when used to elevationally guide a vehicle relative to the string line 12, the wall 13 will be vertical. When used for steering purposes to monitor lateral position of a vehicle relative to string line 12, wall 13 will be horizontal.

The wall 13 pivotally supports a control arm assembly including a pivot shaft 15 (FIG. 3) that is pivotally supported by the housing for movement about a first pivot axis along its center. This axis is perpendicular to the reference plane of wall 13. At its outer end, shaft 15 has a collar 16 fixed to it, the collar 16 being a rigid support for an extended arm 17 that protrudes radially outwardly from the axis of shaft 15. Collar 16 is fixed to shaft 15 by a releasable screw 18. Arm 17 is releasably connected to bracket 16 by a releasable screw 20. At the outer end of arm 17, a smooth bent plate 21 is provided for sliding engagement against the string line 12. It is adjustably connected to arm 17 by means of an integral collar and adjustable screw 22.

Wall 13 has an outwardly protruding collar 23 fixed to it. The collar 23 is engaged by a clamp on the frame member 11 to fix the housing of the control apparatus 10 relative to the frame member 11. This is shown in FIG. 5, where the frame member 11 is recessed to receive collar 23, which is clamped in place by a removable section 24 of the frame member 11, held in place by releasable bolts 25.

The inner end of shaft 15 rotatably supports a roller 26 that is journalled on shaft 15 about an eccentric axis spaced from the pivotal axis of shaft 15 relative to the housing. The roller 26 is in surface engagement with a bifurcated member 27 pivotally connected to the wall 13 by a pin 29. The pivotal axis of member 27 is parallel to and radially offset from the axis of shaft 15. Member 27 is provided with two spaced arms 28, 30, the outer ends of which are brought close to one another and which form parallel extensions at 31. The extensions 31 are adjustably connected by a screw 32 which is threadably engaged through the extension 31 on arm 28 and which bears against the extension 31 on arm 30. By rotation of screw 32, arms 28, 30 can be either spread apart or brought closer to one another, the screw being resisted by the natural resiliency of member 27 which urges arms 28, 30 apart.

Mounted on wall 13 are two conventional electrical control switches 33, 34. Each includes an operator in the form of a button 35 operable in a plane parallel to the selected reference plane of wall 13. The operators for switches 33, 34 respectively abut arms 28 and 30 in an opposed relationship. Assuming that switches 33, 34 are rendered operative by depression of buttons 35, one switch will be activated and the other inactivated in response to pivotal movement of member 27 about the axis of pin 29.

A compression spring 36 abuts the extension 31 of arm 30 and is fixed to an adjustable base screw 37 which varies the compression of spring 36 by rotatable engagement with a bracket 38 on wall 13. A locking nut 40 maintains the selected adjustment of spring 36, which acts through arm 30 and roller 26 to counterbalance the reactive force on arm 17. The use of spring 36 invloves less inertia forces than an alternate counterbalance weight on arm 17. The pressure exerted against the string line 12 by the plate 21 can be varied by adjustment of the pressure on spring 36.

The design of member 27 is such as to permit free rotational movement of shaft 15 relative to the housing, movement of roller 26 being accommodated by the space between the arms 28, 30. This prevents damage to the arm 17 and associated control apparatus which might otherwise occur upon exceptional movement of arm 17 due to external forces. The coaxial mounting of the housing provided by the collar 23 permits simple angular adjustment of the apparatus about the pivot axis of shaft 15 so as to allow proper orientation of switches 33, 34 relative to the reference surface. By adjustment of screw 32, the amount of pivotal motion of member 27 required to operate the respective switches 33, 34 can be either increased or decreased in order to maintain proper centering of the controlled frame relative to the reference surface. In some instances the tolerance might be very close and in others there might be more allowable play before activation of a corrective switch is desired. Screw 32 is also used for factory adjustment of tolerance so that exact placement of switches 33, 34 is not the critical limiting factor with regard to the overall accuracy of the control apparatus 10.

As shown, the housing is completely enclosed within the cylindrical cover 14. An external socket 41 is provided for the electrical leads to the switches 33, 34. The entire apparatus is therefore protected from external damage and can be maintained in a sealed condition to insure initial accuracy during its use.

Minor changes can be made in the above structure without deviating from the basic concepts of this invention and therefore, only the following claims are intended as definition of the invention disclosed herein.

Having thus described my invention, I claim:

1. In a control apparatus for monitoring the position of a frame within a selected plane relative to a surface along a fixed reference element:
    a housing fixed relative to the frame;
    a control arm pivotally mounted on said housing about a first axis perpendicular to said plane, said control arm including a portion thereof extending radially outward from said first axis and being in contact with one surface of the reference element;
    a member pivotally mounted on said housing about a second axis radially offset from a parallel to said first axis, said member having two arms spaced from one another along said plane;
    said control arm further comprising a radial extension thereon engaged against one of said arms;
    a first control switch on said housing having an operator movably engaged with one arm of said member for motion along said plane;
    a second control switch on said housing having an operator movably engaged with the remaining arm of said member for motion along said plane;
    and means operatively connected between the arms of said member for selectively varying the separation between said arms along said plane.

2. An apparatus as set out in claim 1 wherein the radial extension of the control arm comprises a roller rotatably mounted about an axis on the control arm radially offset from and parallel to said first axis; said roller being engaged against an inner surface of one of said arms.

3. An apparatus as set out in claim 2 further comprising:
    biasing means operatively connected between the housing and said member to maintain said one arm arm against said roller.

4. An apparatus as set out in claim 1 wherein said member comprises an integral structure including the two arms.

5. An apparatus as set out in claim 1 wherein said member comprises:
    an integral structure including the two arms, the two arms being adjustably connected to one another by a screw operative to spread the arms along said plane.

6. An apparatus as set out in claim 1 wherein the housing is fixed to the frame by a bracket centered about said first axis and permitting selective angular adjustment of the housing relative to said first axis.

References Cited

UNITED STATES PATENTS

| | | | |
|---|---|---|---|
| 2,801,308 | 7/1957 | Cubellis | 200—61.41 XR |
| 3,217,119 | 11/1965 | Suozzo | 200—52 |
| 3,291,953 | 12/1966 | Luik | 200—47 XR |
| 3,343,008 | 9/1967 | Bancroft | 200—61.18 XR |

HERMAN O. JONES, Primary Examiner

U.S. Cl. X.R.

94—46; 200—61.18, 61.41